United States Patent [19]
Djupsjobacka

[11] Patent Number: 5,363,230
[45] Date of Patent: Nov. 8, 1994

[54] METHOD OF LINEARIZING THE TRANSMISSION FUNCTION OF MODULATOR

[75] Inventor: Anders G. Djupsjobacka, Solna, Sweden

[73] Assignee: Telefonaktiebolaget L M Ericsson, Stockholm, Sweden

[21] Appl. No.: 992,100

[22] Filed: Dec. 17, 1992

[30] Foreign Application Priority Data

Dec. 20, 1991 [SE] Sweden .............................. 9103807-5

[51] Int. Cl.[5] .......................................... H04B 10/04
[52] U.S. Cl. .................................. 359/182; 359/181; 359/245; 359/259; 385/2
[58] Field of Search ............... 359/180, 181, 182, 183, 359/188, 245, 259; 380/1, 2, 3, 8, 9, 10

[56] References Cited

U.S. PATENT DOCUMENTS

| | | | |
|---|---|---|---|
| 4,340,272 | 7/1982 | Papuchon et al. | 350/96.14 |
| 4,447,116 | 5/1984 | King et al. | 350/96.13 |
| 4,798,429 | 1/1989 | Djupsjobacka | 350/96.14 |
| 4,820,009 | 4/1989 | Thantyavarn | 350/96.13 |
| 4,842,367 | 6/1989 | Djupsjobacka | 350/96.14 |
| 4,850,667 | 7/1989 | Djupsjobacka | 350/96.4 |
| 4,878,030 | 10/1989 | Vincze | 330/149 |
| 5,002,353 | 3/1991 | Johnson | 350/96.14 |
| 5,003,624 | 3/1991 | Terbrack et al. | 359/182 |
| 5,148,503 | 9/1992 | Skeie | 385/3 |
| 5,161,206 | 11/1992 | Djupsjobacka | 385/2 |
| 5,249,243 | 9/1993 | Skeie | 359/245 |

FOREIGN PATENT DOCUMENTS

| | | | |
|---|---|---|---|
| 61-81057 | 4/1986 | Japan | H04L 27/20 |
| WO91/06882 | 5/1991 | WIPO | G02B 6/26 |

OTHER PUBLICATIONS

P. Ashley et al., "Linearization Technique for a Guided-Wave Electrooptic Brag Modulator", Proc. IGWO, poster paper THCC12 (Feb. 1986).

G. Betts et al., "On the Linear Dynamic Range of Integrated Electrooptic Modualtors", IEEE Journal of Quantum Electronics vol. QE-22, pp. 1009-1011 (Jul. 1986).

J. L. Brooks et al., "Implementation of Dual Parallel Modulation in Lithium Niobate", Integrated Photonics Research, p. 55 (1991).

W. K. Burns et al., "Interferometric Waveguide Modulator with Polarization Independent Operation", Appl. Phys. Lett. vol. 33, pp. 944-947 (Dec. 1, 1978).

L. M. Johnson et al., "Reduction of Intermodulation Distortion in Interferometric Optical Modulators", Optics Letters vol. 13, pp. 928-930 (Oct. 1988).

S. K. Korotky et al., "Dual Parallel Modulation Schemes for Low-Distortion Analog Optical Transmission", IEEE Journal on Selected Areas in Communications vol. 8, pp. 1377-1381 (Sep. 1990).

(List continued on next page.)

Primary Examiner—Richard E. Chilcot, Jr.
Assistant Examiner—Rafael Bacares
Attorney, Agent, or Firm—Burns, Doane, Swecker & Mathis

[57] ABSTRACT

A method of linearizing a modulator (1) having two parallel-coupled sub-modulators (2, 3). The complete transmission function of the modulator includes parameters which relate to power division (A, 1-A) of a non-modulated carrier wave ($P_{in}$) and a relationship (B) between the activation degree of the sub-modulators (2, 3). The transmission function is simplified and series-expanded with two higher-order terms, each having a respective coefficient. An expression for intermodulation distortion is calculated with the aid of the series-expansion and with control signals (V1, V2) having two or three frequencies. The signs of the coefficients are determined so that the terms having these coefficients will mutually counteract their respective distortion contributions, and limited search regions for the parameters (A, B) are calculated with the aid of the sign-determined coefficients. In accordance with secondary conditions for high electrooptic efficiency and pronounced modulation depth, the distortion level of the modulator is calculated with the aid of the complete transmission function in the search regions.

6 Claims, 4 Drawing Sheets

OTHER PUBLICATIONS

J. J. Pan, "High Dynamic Range Microwave Electro-Optic Modulators", *SPIE* vol. 1102, pp. 20–29 (1989).

R. V. Schmidt et al., "Directional Coupler Switches, Modulators, and Filters Using Alternating Δβ Techniques", *IEEE Transactions on Circuits and Systems* vol. CAS-26, pp. 1099–1108 (Dec. 1979).

E. M. Zolotov et al., "Integrated Optical Mach–Zehnder Modulator with a Linearized Modulation Characteristic", *Sov. J. Quantum Electron.* vol. 18, pp. 401–402 (Mar. 1988).

METHOD OF LINEARIZING THE TRANSMISSION FUNCTION OF MODULATOR

The present invention relates to a method of linearizing the transmission function of a modulator, wherein the modulator includes at least two mutually connected sub-modulators, each having a non-linear transmission function, and wherein the transmission function of the modulator is given by a relationship between a modulated carrier wave and a modulated signal and includes a number of parameters.

BACKGROUND

In, for instance, the analog transmission of TV-signals over optical fibres, it is highly desirable to be able to modulate a transmitted carrier wave linearly. Non-linear modulation results in intermodulation distortion which disturbs neighbouring channels. Carrier waves having for instance the frequencies of 50 Mhz, 100 Mhz and 150 Mhz can be transmitted on optical fibres. When the modulator transmission function is non-linear, the two first-mentioned carrier wave frequencies are liable to be added together and therewith disturb the frequency of 150 Mhz.

One typical method of modulating carrier waves in the aforesaid application is to use a laser diode that has a constant light power and whose outgoing lightwave is modulated with an external modulator. The type of modulator used is often a so-called Mach-Zehnder modulator, which basically has a sinusoidal transmission function. This transmission function can be linearized, for instance, in the manner disclosed in an article in SPIE, Vol. 1102, Optical Technology for Microwave Applications IV (1989), pp. 20–29, by J. J. Pan: "High Dynamic Range Microwave Electro-Optic Modulators". The article describes, with reference to its FIG. 3, a modulator that has two parallel-coupled electrooptic Mach-Zehnder modulators. An incoming lightwave is divided between the modulators and is modulated in one of the Mach-Zehnder modulators by an electric microwave signal of desired fundamental frequency. Because the modulator is non-linear, harmonics of the fundamental frequency appear in the modulated light signal. Compensation is made for an undesirable contribution from the first occurring harmonic with three times the fundamental frequency. This is achieved by modulating the incoming lightwave in the other of said Mach-Zehnder modulators, and the lightwaves from the two modulators are mutually superimposed at the modulator outlet. The undesirable contribution from the first harmonic can be totally compensated for by suitable choice, among other things, of the modulation voltages applied to the two modulators.

A linearized Bragg-modulator is described in an article by P. R. Ashley and W. S. C. Chang: "Linearization technique for a guided wave electrooptic Bragg modulator", Proceedings IGWO '86, poster paper THCC 12. This modulator has two parallel-coupled Bragg-elements and its transmission function is compensated for the first occurring harmonic. This compensation is effected in a manner which corresponds to the manner in which compensation is effected in the parallel-coupled Mach-Zehnder modulators in the aforesaid article by J. J. Pan.

The drawback with the aforesaid modulators is that only the first occurring harmonic is compensated for or counteracted. Compensation for further overtones can be effected by coupling several modulator elements in parallel. Such modulators, however, are complicated and it is found that only small improvements are obtained. In some applications, a totally non-compensated Mach-Zehnder modulator will result in lower intermodulation distortion than a modulator in which the first occurring overtone is compensated for in the aforesaid manner.

A method for compensating the first occurring harmonic by a Mach-Zehnder modulator is described in an article in IEEE Journal on Selected Areas in Communications, Vol. 8, No. 7, pp. 1377–1381, Sep. 1990, by S. K. Korotky and R. M. de Ridder: "Dual Parallel Modulation Schemes for Low-Distortion Analog Optical Transmission". According to this article, a third order intermodulation distortion is suppressed.

The Swedish Patent Application No. 9003158-4 corresponding to U.S. Pat. No. 5,161,206 of the present applicant considers the radius of curvature of the transmission function of a modulator. The output signal of a non-linear sub-modulator is compensated to a linearized transmission function, by superimposing on said output signal an output signal from at least one further non-linear sub-modulator. Conventionally, it is endeavoured to obtain a steep average slope of the linearized transmission function within a suitably selected interval of the modulator control signal. This results in good modulation of the carrier wave and a control signal of reasonable amplitude. The radius of curvature of the linearized transmission function will have the greatest possible value within this control signal interval for an optimally designed modulator.

The aforesaid modulators have very little distortion in the case of small modulation depths, although the distortion increases greatly with the modulation depth. When specifying the performance of a modulator, it is very usual to determine a constant, highest distortion level. A problem then resides in providing a modulator of great modulation depth which will keep distortion beneath the desired highest level. No advantage is gained when the modulator distortion lies far beneath the specified highest distortion level at small modulation depths.

SUMMARY

The present invention relates to a method of linearizing the transmission function of a modulator. The invention has as its starting point the desire to maintain the distortion of a modulated carrier wave beneath a given level, even when the modulator is influenced by a plurality of modulating frequencies, while desiring a large modulation depth.

The complete transmission function of the modulator is complicated having several parameters and it would appear impossible to derive a conclusive expression for the distortion. Although numerical calculations can be made, the task of calculating the distortion for all possible values of the parameters concerned and then selecting the appropriate parameter values for the modulator is highly time-consuming.

In accordance with the invention, there is used a simplified transmission function for calculating intermodulation distortion of the modulator and limited search regions are determined within limited parameter intervals. The simplified transmission function is series-expanded by at least two higher order terms having different coefficients. The series-development results in several successive higher-order terms for the intermodulation distortion. The calculations can be carried out on the basis of choosing the signs and values of the coefficients in the terms for intermodulation distortion so that the individual contributions to said distortion will counteract one another. In those regions where this takes place, the parameter values or mutual relationships between the parameters which delimit the search regions are calculated. Calculations are made in the search regions with the aid of the complete transmission function which gives the relationship between the parameter values, the distortion levels and the modulation depth.

The modulator may have a controllable parameter, for instance a power division between two sub-modulators. According to the invention, this controllable parameter can be given a value which lies beneath a given distortion level. This enables the modulator to be trimmed even when the modulator is operating.

BRIEF DESCRIPTION OF THE DRAWINGS

The invention will now be described in more detail with reference to the accompanying drawings, in which

FIG. 3b is a distortion diagram for a modulator having a specified distortion level which is lower than the lever in FIG. 3a;

DETAILED DESCRIPTION

Figure 1:
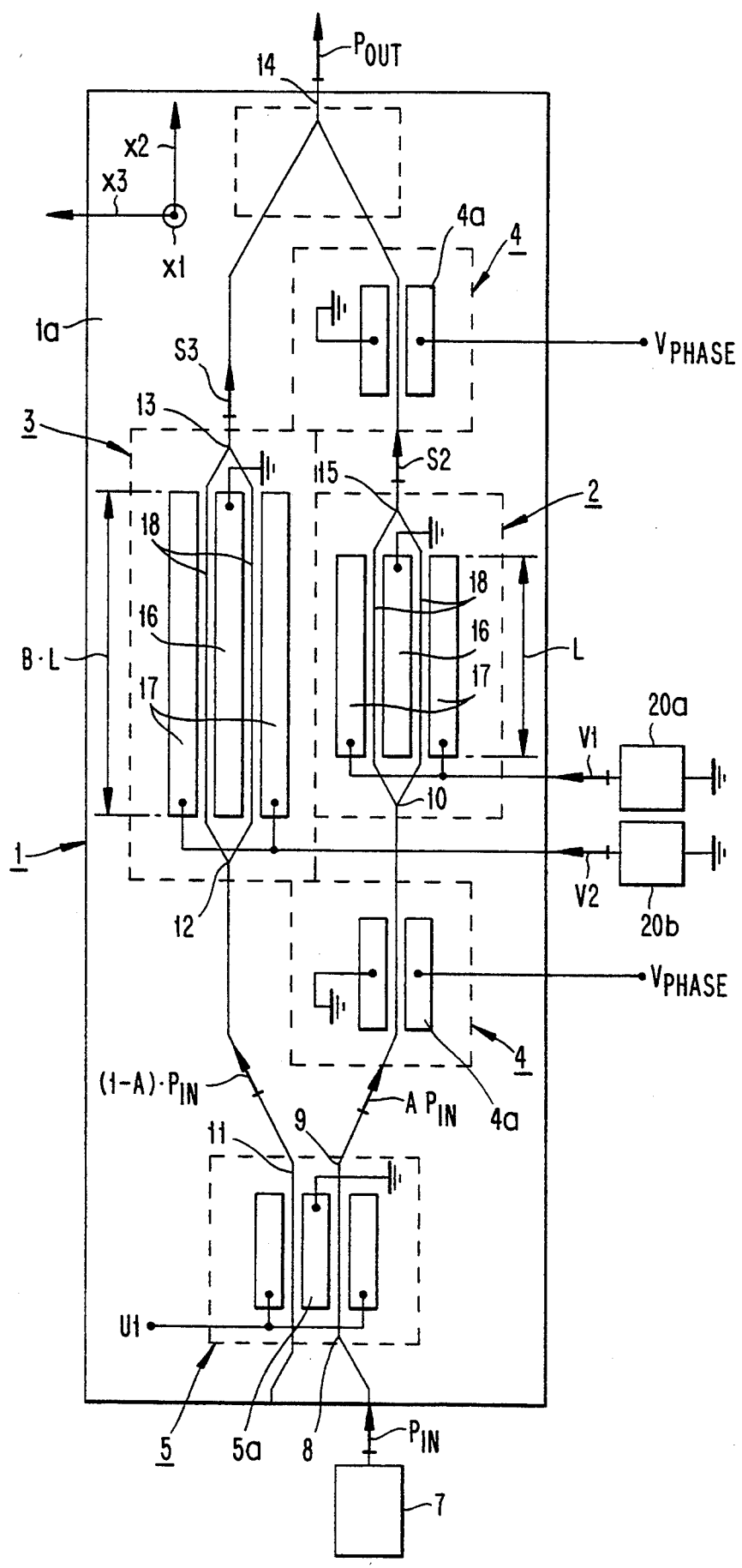
FIG. 1 illustrates an electrooptic modulator from above.

FIG. 1 illustrates an electrooptic modulator 1 which is constructed from a single-crystal, lithium niobate substrate 1a. The modulator 1 has two sub-modulators 2 and 3, which in the illustrated case are Mach-Zehnder modulators. Mach-Zehnder modulators are described, for instance, in Appl. Phys. Lett. 33(11), Dec. 1, 1978, W. K. Burns, et al: "Interferometric waveguide modulator with polarization-independent operation". The modulator 1 has two phase-shifters 4 and one power divider 5, which is a directional coupler. The directional coupler has an input 8 which is connected to a laser diode 7, a first output 9 which is connected to an input 10 of the sub-modulator 2, and a second output 11 which is connected to an input 12 of the sub-modulator 3. The directional coupler has electrodes 5a in its interaction region, by means of which the light power to the two sub-modulators can be influenced. The phase-shifters 4 have electrodes 4a by means of which the refractive index in the waveguide of the phase-shifters can be changed. Each of the sub-modulators 2 and 3 have a respective output 15 and 13, which are connected to an output 14 on the modulator 1. Each of the two sub-modulators includes control devices which are comprised of a centre electrode 16 and two outer electrodes 17. These control devices have respectively a length L and a length B·L, where B is a quotient between the degrees of activation of the sub-modulators. The two waveguides 18 of the respective modulators extend in the space defined between the electrodes. The crystallographic x1-axis of the lithium niobate substrate 1a extends perpendicularly to the upper surface of the substrate, whereas its x2-axis is parallel to the waveguides 18 and its x3-axis is perpendicular to said waveguides 18, as illustrated by a coordinate system x1, x2, x3 shown at the upper left in the Figure. This chosen orientation of the crystal axes causes the waveguides to be placed between the electrodes 16 and 17 in a known manner, as illustrated in the Figure. One electrode 5a of the power divider 5 is connected to earth potential and its two other electrodes are connected to a control voltage U1, by means of which the power division is controlled. The center electrode 16 of the sub-modulators are both connected to ground potential.

The outer electrodes 17 of the sub-modulator 2 are connected to a control signal source 20a which delivers a control signal V1 to said electrodes, and also to a control signal source 20b which delivers a control signal V2 to the outer electrodes 17 of the sub-modulator 3. A non-modulated carrier wave delivered by the laser diode 7 and having a power $P_{in}$ is divided in the power divider 5 into a part $A \cdot P_{in}$, which is delivered to the sub-modulator 2, and a remaining part $(1-A) \cdot P_{in}$, which is delivered to the sub-modulator 3. The sub-modulators 2 and 3 deliver modulated part-waves S2 and S3 respectively, which are superimposed to form a resultant modulated carrier wave having a power $P_{out}$, which is delivered from the output 14. The two sub-modulators 2 and 3 have sinusoidal-like transmission functions and are each modulated around their inflection points to obtain correct function. This is often referred to as the modulators being in quadrature. The quadrature state is set with the aid of bias voltages $V_{bias1}$ and $V_{bias2}$ of the control signal $V1 = V_{mod} + V_{bias1}$ and of the control signal $V2 = V_{mod} + V_{bias2}$ respectively. $V_{mod}$ is a common modulation voltage by means of which it is desired to modulate the carrier wave $P_{in}$ to a modulation depth M, so as to obtain the modulated carrier wave $P_{out}$. The part-waves S2 and S3 are also in quadrature, which is set with a voltage $V_{phase}$ to the phase-shifters 4. By modulation depth M is meant a quotient between the amplitude of the lightwave $P_{out}$ and a maximum possible amplitude of the lightwave. According to one alternative embodiment, the separate degrees of activation of the sub-modulators 2 and 3, the parameter B, can be achieved by giving the sub-modulator 3 the same length as the sub-modulator 2 but applying a higher modulation voltage $B \cdot V_{mod}$ to the sub-modulator 3.

A relatively complete linearized transmission function of the sub-modulator 2 or of the sub-modulator 3 is given generally by the following relationships (1), (2), (3) and (4), which denote a full-scale microwave model. Among other things, the model takes into account different propagation velocities of the lightwaves in the waveguides 18 and of the microwaves in the electrodes 17, although the model requires that the modulators work in quadrature.

$$P_2 = P_1 \cos^2\left(\Delta n \frac{\pi L}{\lambda_0}\right) \quad (1)$$

$$\Delta n = \quad (2)$$

$$-\frac{n^3 \eta r_{33}}{2dL} \int_0^L \left(V_{bias} + \sum_{k=1}^{l} V_{mod,k} e^{-\alpha_k z} \cos(\beta_k z + \phi_k)\right) dz$$

$$\alpha_k = \alpha_r + \alpha_c \sqrt{f_k} + \alpha_d f_k \quad (3)$$

$$\beta_k = 2\pi f_k(\sqrt{\epsilon_e} - n)/c \tag{4}$$

In these equations, $P_2$ = instantaneous optic power output
$P_1$ = optic power input
$\Delta n$ = effective change of the refraction index in the waveguide
L = length of modulator
$\lambda_0$ = wavelength in vacuum
n = refractive index
$\eta$ = overlap parameter
$r_{33}$ = electrooptic tensor element
d = electrode spacing
l = number of modulation frequencies
$V_{bias}$ = bias voltage
$V_{mod,k}$ = amplitude of respective modulation frequencies
$\alpha_k$ = loss term
$\beta_k$ = dephasing parameter
$\psi_k$ = instantaneous phase of respective modulation frequency
$\alpha_r$ = resistive losses
$\alpha_c$ = waveguide losses
$f_k$ = modulation frequency
$\alpha_d$ = dielectric losses
$\epsilon_e$ = effective dielectric constant
c = velocity of light in vacuum As aforementioned, the above relatively complicated equations (1)-(4) define a transmission function of a simple Mach-Zehnder modulator, such as the submodulator 2 for instance. It is desirable to be able to utilize these equations for calculating the distortion of the output signal $P_{out}$. This enables the optimum parameter values in the linearized transmission function of the modulator 1 to be stated. However, extreme difficulties are encountered when carrying out this calculation directly with the aid of the equations (1)-(4). The object of the present invention is to provide a method by means of which the desired linearization can be effected in accordance with the following.

It is possible to use the equations (1)-(4) to calculate by numerical methods how the distortion level depends on the modulation depth M within limited search intervals for the parameters A and B in FIG. 1. These search intervals denote limited search regions and in order to find these regions, there is used a simplified model of the transmission function of the modulator in accordance with $$\frac{P_{out}}{P_{in}} = A\cos^2\left(\frac{\pi V_{mod}}{2V_\pi} - \frac{\pi}{4}\right) + \tag{5}$$

$$(1-A)\cos^2\left(B\frac{\pi V_{mod}}{2V_\pi} + \frac{\pi}{4}\right)$$

The magnitude $V_\pi$ signifies a modulating voltage which phase-shifts both branches of the Mach-Zehnder modulators through $\pi$ radians in relation to one another. The equation (5) can be further simplified to equation (6), given below, which has a form suitable for calculating distortion of the modulated carrier wave $P_{out}$.

$$Q(x) = A \sin(x) - (1-A)\sin(Bx) \tag{6}$$

The variable x is dependent on the modulation voltage $V_{mod}$. The equations (5) and (6) give identical distortion products, although the equation (6) is easier to handle. In order to make analytical considerations possible, the equation (6) is expanded to a Fourier series, so as to obtain an equation (7)

$$Q(x) \approx (A + AB - B)x + \tag{7}$$

$$\frac{B^3 - A - AB^3}{6}x^3 + \frac{A + AB^5 - B^5}{120}x^5 + \dots$$

which in an abbreviated form is written as $$Q(x) = q_1 x + q_3 x^3 + q_5 x^5 \tag{8}$$

The coefficient $q_1$ corresponds to the electrooptic efficiency. The series expansion is interrupted, so that only the first two higher order terms having the coefficients $q_3$ and $q_5$ are included. The simplified transmission function in Fourier-expanded form, the equation (8), enables distortion products for the case of a small signal to be calculated. According to the illustrated embodiment, there are used two modulated frequencies of the variable x, corresponding to angular velocities $\omega_1$ and $\omega_2$, in other words $$x = M\sin(\omega_1 t) + M\sin(\omega_2 t) \tag{9}$$

where t is time. The following expressions for the modulated carrier wave are obtained with this expression for the variable x:

(10)

$Q(x) = [Mq_1 + 9/4 M^3 q_3 + 25/4 M^5 q_5][\sin(\omega_1 t) + \dots]$ (a)

$\pm [3/4 M^3 q_3 + 25/8 M^5 q_5][\sin((2\omega_1 \pm \omega_2)t) + \dots]$ (b)

$-[1/4 M^3 q_3 + 25/16 M^5 q_5][\sin(3\omega_1 t) \dots]$ (c)

$+[5/8 M^5 q_5][\sin((3\omega_1 \pm 2\omega_2)t) \dots]$ (d)

$\pm [5/16 M^5 q_5][\sin((4\omega_1 \pm \omega_2)t) \dots]$ (e)

$+[1/16 M^5 q_5][\sin(5\omega_1 t) \dots]$ (f)

In total, the expression (10) for Q(x) includes six terms, referenced (a)-(f), which are only partly written for the sake of simplicity. The constants preceding the sine functions which include coefficients $q_1$, $q_3$ and $q_5$, however, are complete. In the first of these terms (a), arguments of the sine function has only one frequency and the term describes the desired carrier wave modulation. The two following terms (b) and (c) are first higher-order terms for intermodulation distortion. In this case, the terms have a total of three frequencies in the argument of the different sine functions and are therefore said, in the usual way, to be of the third order. The three following terms (d), (e) and (f) are second higher-order terms for intermodulation distortion and are of the fifth order. No even-order terms occur in the illustrated embodiment.

Figure 2:
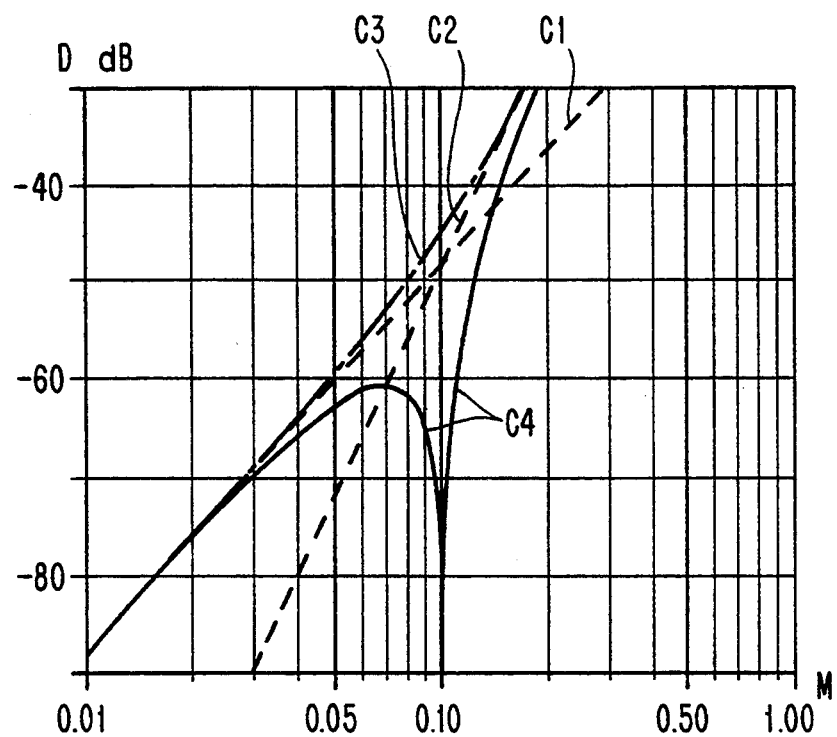
FIG. 2 is a distortion diagram for determining search areas.

It will be evident from equation (10) that the dominating distortion contributions derive from the second and the third term, (b) and (c), in this equation. In these two terms, each of the constants preceding the sine functions has a respective $q_3$-term and a respective $q_5$-term. An essential step of the inventive method is to find the search regions for the parameters A and B of the transmission function in which these $q_3$-terms and $q_5$-terms counteract one another. This method step is illustrated in FIG. 2, which is a diagram with the modulation depth M on the abscissa and a distortion level D expressed in dB on the ordinate. The diagram is constructed for the second term (b) in the equation (10). A broken line C1 denotes the distortion contribution caused by the $q_3$-term, while a broken line C2 denotes, correspondingly, the distortion contribution caused by the $q_5$-term. When the coefficients $q_3$ and $q_5$ have mutually the same sign, the total distortion according to a chain curve C3 is obtained, while a full-line curve C4 denotes the total distortion when the coefficients $q_3$ and $q_5$ have mutually the opposite sign. If the specified distortion level is determined at $-60$ dB, there is obtained a greatest modulation depth $M = 4.5 \times 10^{-2}$ according to curve C3, while according to curve C4, there is obtained a modulation depth of $M = 11 \cdot 10^{-2}$. The curve C4 thus more than doubles the modulation depth in comparison with curve C3. This consideration gives the result that the coefficients $q_3$ and $q_5$ shall have different signs, and that a substantial increase in the modulation depth M can be achieved in comparison with known techniques. A diagram similar to the diagram in FIG. 2 can be drawn for the third term (d) of the relationship (10). Such a diagram also gives the result that $q_3$ and $q_5$ shall have different signs in order to counteract one another, although this counteraction occurs at another modulation depth M and another distortion level D than shown in FIG. 2. This makes continued analytical processing very difficult to carry out and it is therefore necessary to use numerical calculating methods.

However, the following analytical considerations are made in order to facilitate these numerical calculations. According to the aforegoing, the coefficients $q_3$ and $q_5$ shall have mutually opposite signs. The following table illustrates where these coefficients have their zero crossings, expressed in the parameters A and B in the transmission function according to relationship (5).

| Parameter | Zero crossing | Significant ranges R1 | R2 |
|---|---|---|---|
| $q_1 = A + AB - B$ | $A = B/(1+B)$ | $q_1$ positive | $q_1$ positive |
| $q_3 = (B^3 - A - AB^3)/6$ | $A = B^3/(1+B^3)$ | $q_3$ positive | $q_3$ negative |
| $q_5 = (A + AB^5 - B^5)/120$ | $A = B^5/(1+B^5)$ | $q_5$ negative | $q_5$ positive |

The presentation also shows the two significant search regions, referenced R1 and R2, where $q_3$ and $q_5$ have opposite signs. The table shows that $$B/(1+B) < A < B^3/(1+B^3) \quad (11)$$

applies for the search region R1 whereas $$B^5/(1+B^5) < A < 1 \quad (12)$$

applies for the search region R2.

A consideration similar to the consideration discussed above can be made for a modulating signal x having three or more modulating frequencies and producing a result similar to that above.

The search regions R1 and R2 can be further limited. The parameter B shall have a value such that the distortion contributions counteract one another in the aforedescribed manner, while, at the same time, making the provision that the electrooptic efficiency $q_1$ shall be influenced only relatively slightly. The modulation depth M shall be maximized for a specified distortion level D. It is also desirable that this distortion level can be influenced with the aid of the power division A, so as to enable a greater modulation depth to be obtained when a lower distortion level D is specified.

Figure 3A:
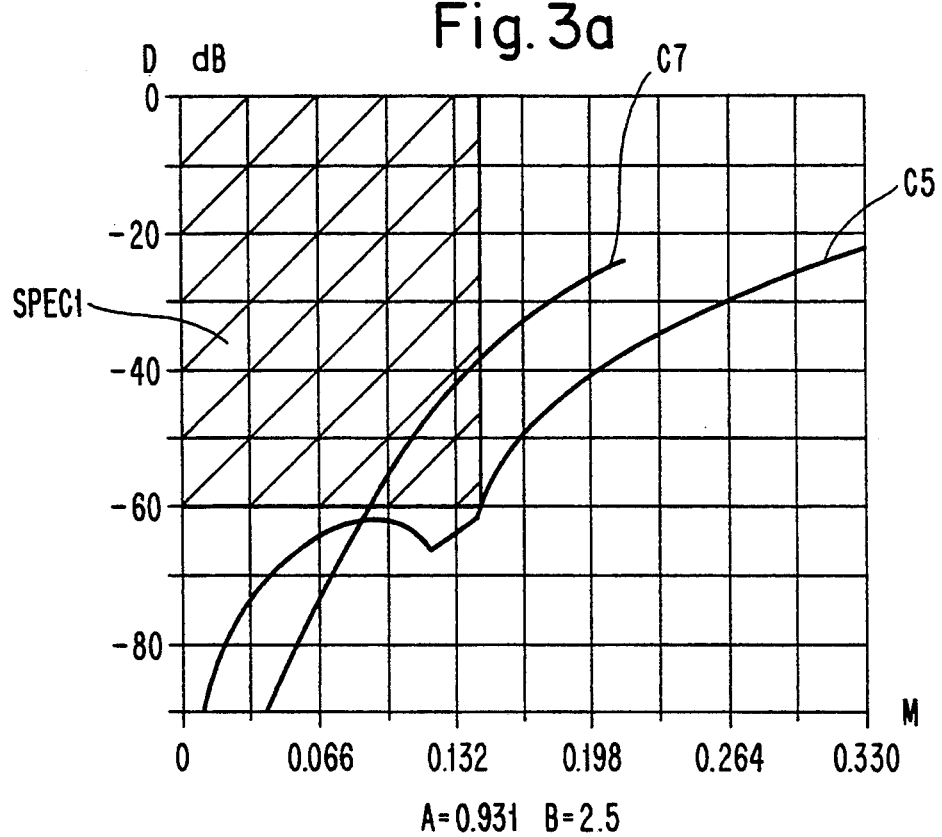
FIG. 3a is a distortion diagram for a modulator having a specified distortion level.
Figure 3B:
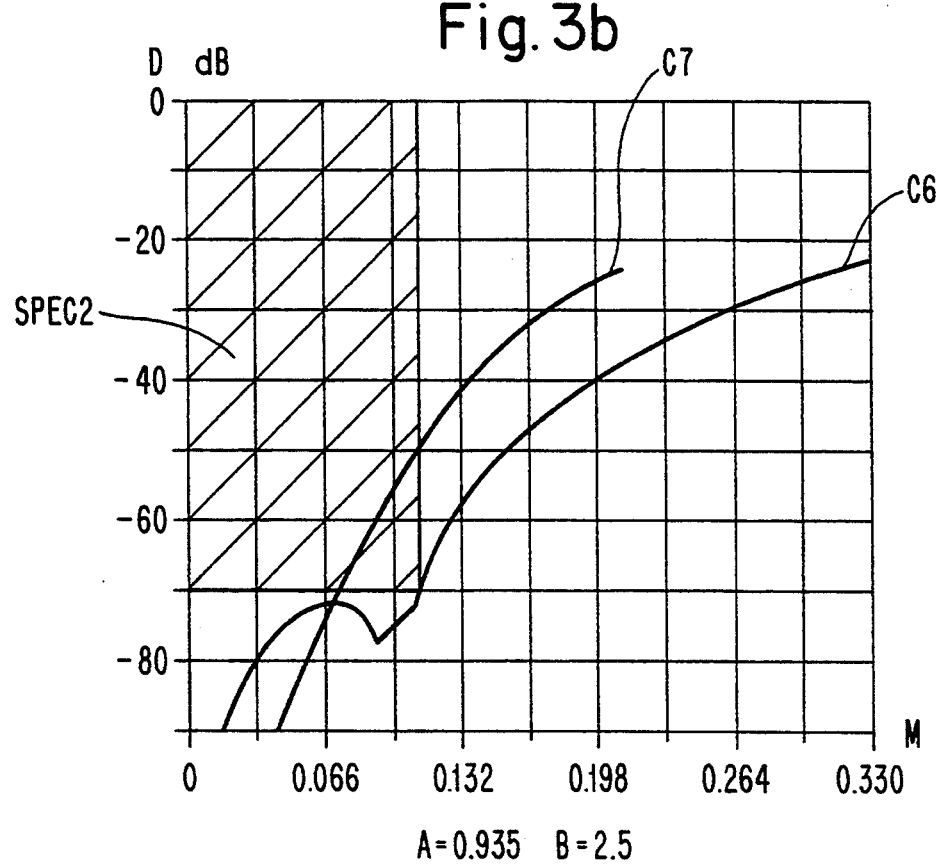

Those search regions which can be arrived at numerically are obtained with the aid of the equations (11) and (12) and the aforedescribed further restrictions. The result obtained by such numerical calculations of the search region R1 according to the equation (11) is shown in FIGS. 3a and 3b. These Figures are diagrams similar to FIG. 2, with the modulation depth M plotted on the abscissa and the distortion level D on the ordinate. Both diagrams have been calculated with the aid of the more complete microwave model in equations (1)-(4) for three different modulation frequencies. FIG. 3a shows the power division $A = 0.931$ and the relationship between the activation degree of the sub-modulators $B = 2.5$, while FIG. 3b shows the power division $A = 0.935$ and the activation degree $B = 2.5$. A curve C5 denotes a working line with limitation of the intermodulation distortion under which the linearized modulator 1 in FIG. 1 works. A hatched area SPEC1 denotes an area outside which the working line C5 must lie in order to fulfill a specification of the modulator. Correspondingly, curve C6 in FIG. 3b denotes a working line which must lie outside an area SPEC2 in order for the modulator to fulfill an alternative specification. It will be evident that the modulator 1 can be switched between the specifications SPEC1 and SPEC2, simply by adjusting the power division between $A = 0.931$ and $A = 0.935$. This switching process is effected with the aid of the voltage U1 in FIG. 1. It should be noted that the curves C5 and C6 are composed of the curve portions belonging to different terms for high-order intermodulation distortion.

A curve C7 in FIG. 3a denotes a working line for known modulators. These modulators produce a very low distortion D at small modulation depths, for example $M < 0.066$, although the working line C7 cuts through the specified areas SPEC1 and SPEC2. It can be mentioned that the search region R2 according to the equation (12) was investigated numerically but failed to give any parameter combinations whose distortion and modulation values were an improvement on the values obtained with the known modulators.

The numerical calculations on which the diagrams of FIG. 3a and 3b are based were carried out with the aid of a relatively powerful computer designated SUN-SPARC. The calculation was carried out to an accuracy of ten digits and took about twenty-four hours to complete. It will be evident from this that the task of working through all conceivable parameter combinations A and B with the aid of present-day computer technology would be extremely expensive and time-consuming. The calculation work is drastically reduced by means of the inventive method.

Figure 4:
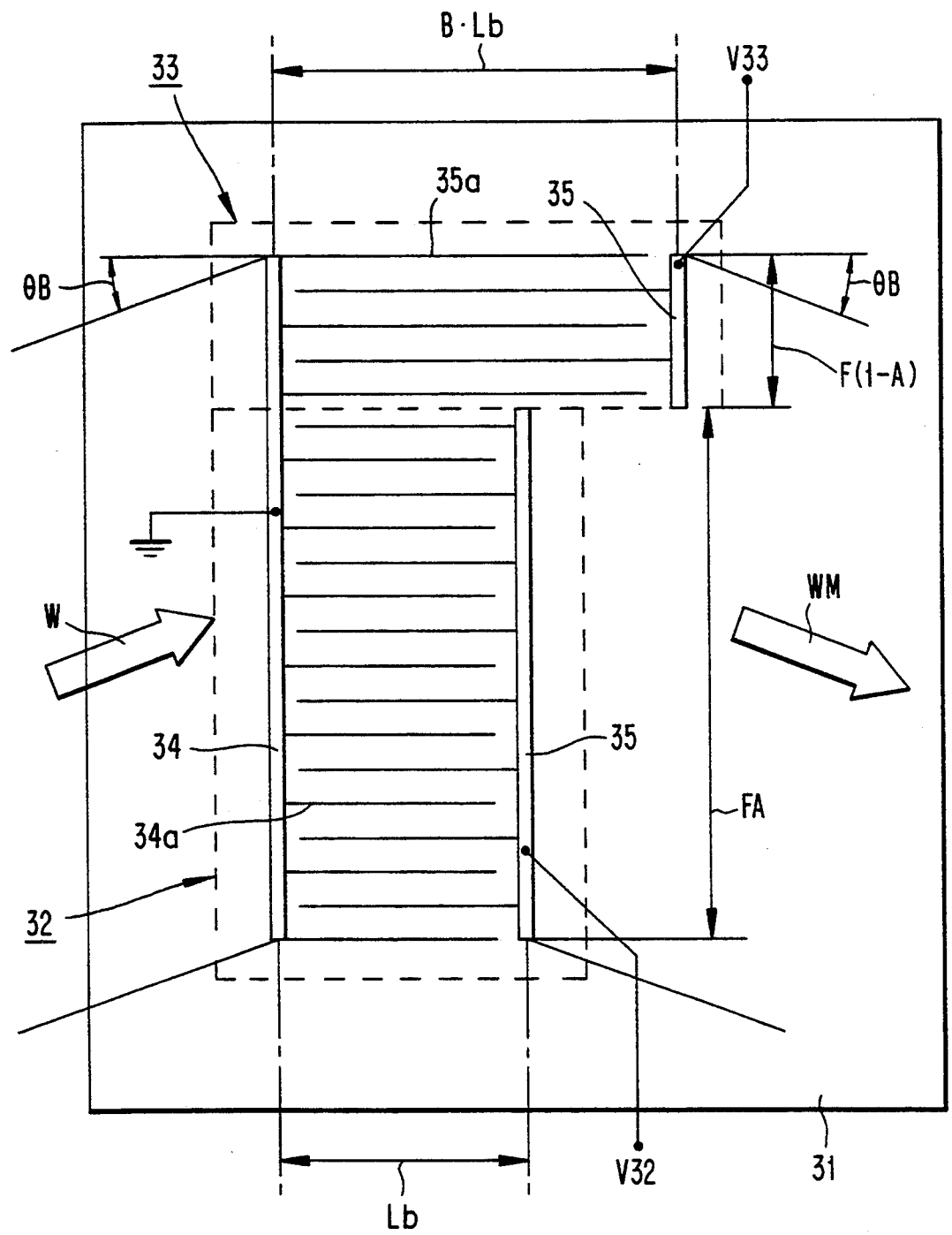
FIG. 4 illustrates an alternative modulator from above.

Two modulators which can be linearized by means of the inventive method will now be described with reference to FIGS. 4 and 5. FIG. 4 illustrates a Bragg-modulator having a linearized transmission function. Mounted on a substrate 31 of electrooptical material are two sub-modulators 32 and 33. These sub-modulators are both Bragg-elements, each of which has an array of lattice electrodes 34 and 35 respectively, having respective fingers 34a and 35a. The modulating control signals V32 and V33 are connected between the electrodes. The sub-modulator 32 has an electrode length Lb and an electrode width F·A, whereas the sub-modulator 33 has an electrode length B·Lb and an electrode width F·(1−A). A planar lightwave, a carrier wave W, is incident on the electrodes 34, 35 of the modulator arrangement at an angle of incidence ΘB. By diffraction with a surface acoustic or bulk acoustic wave generated by the electrodes, part of the power of the lightwave W is deflected and a modulated wave WM leaves the modulator at an angle ΘB, as shown in the Figure. The modulated wave WM constitutes superimposed deflected part lightwaves from the two sub-modulators 32 and 33. The power of the incident carrier wave W is divided in the parts A and (1−A) as a result of the different widths of the electrodes. Similar to the aforementioned Mach-Zehnder modulators, the Bragg-elements have sinusoidal transmission functions. Similar to the aforegoing, the power division A and the relationship B between the electrode lengths are included in the transmission function of the linearized Bragg-modulator. The transmission function is linearized in the same way as that described with reference to the FIG. 1 embodiment.

Figure 5:
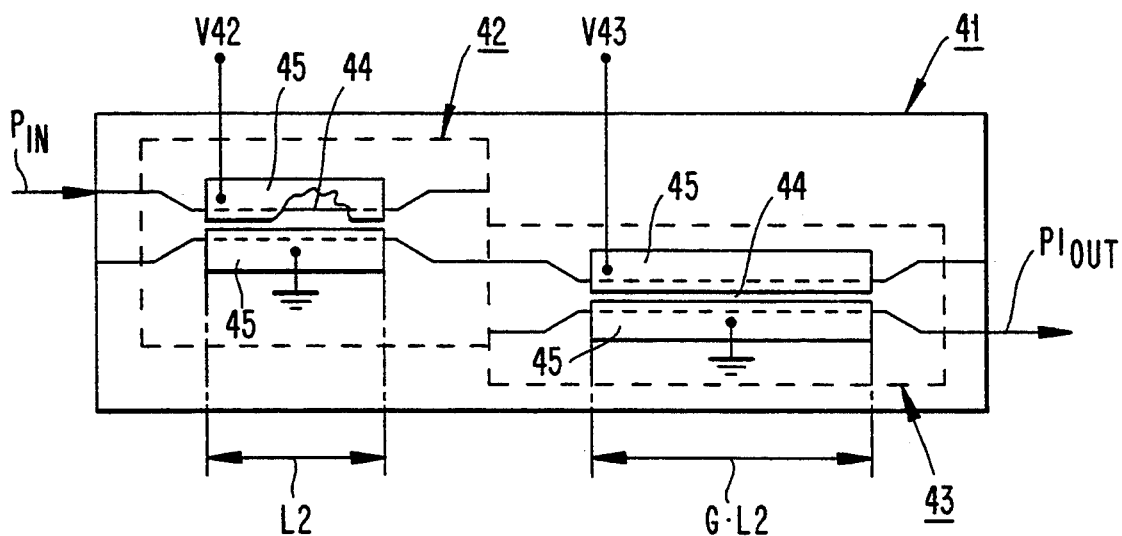
FIG. 5 illustrates from above a further alternative modulator.

FIG. 5 illustrates schematically an electrooptic modulator 41 having two sub-modulators 42 and 43 which are connected together in series. The sub-modulators are directional couplers, each having a respective interaction range, in which light waveguides 44 extend at a small distance from one another. Electrodes 45 are placed on both sides of the light waveguides 44 and modulating signals V42 and V43 are applied to the electrodes. The sub-modulators 42 and 43 have a respective electrode length of L2 and G·L2, where the constant G denotes the quotient between the activation degree of respective sub-modulators. The non-modulated carrier wave $P_{in}$ can be modulated to a modulated carrier wave $P1_{out}$, with the aid of the modulating signals V42 and V43. For a more detailed description of directional couplers, the reader is referred to IEEE Transactions on Circuits and Systems, Vol. CAS-26, No. 12, December 1979. R. V. Schmidt and R. C. Alferness: "Directional Coupler Switches, Modulators, and Filters Using Alternating $\Delta\beta$ Techniques", which is incorporated here by reference. Each of the sub-modulators 42 and 43 has a relatively complicated non-linear transmission function which can be given through coupled differential equations. The non-linear transmission functions together give a linearized transmission function to the modulator 41. Although this function is complicated, the inventive method can be applied to linearize the transmission function. The search regions for modulator parameters within which two consecutive higher-order terms counteract each other can be limited by simplifications and numerical calculations. It is possible to make further numerical calculations within these search regions on the linearized transmission function, in order to find final parameter values.

What is claimed is:

1. A method for linearizing a response of an electrooptic modulator, said modulator including at least two mutually connected sub-modulators and having a response determined by a transmission function and a plurality of selectable parameters, each sub-modulator having a respective non-linear transmission function and a respective activation degree, and the selectable parameters including power levels of carrier waves applied to the sub-modulators and a ratio of the activation degrees of the sub-modulators, comprising the steps of:

determining the selectable parameters such that intermodulation distortion of a modulating control signal is less than a predetermined value and the modulator's transmission function is linearized based on the steps of:

forming a model relationship for the modulator's transmission function, said model relationship including parameters representing the power levels and the activation degree ratio;

forming a series expansion of the model relationship, the series expansion comprising at least two consecutive terms of second or higher degree, each consecutive term having a respective coefficient;

representing a modulated carrier wave to be produced by the modulator by an expression having at least one higher-order term representing intermodulation distortion;

determining the signs of the coefficients of the consecutive terms that minimize said at least one higher-order term representing intermodulation distortion;

determining at least one search region for the power levels and the activation degree ratio based on the sign-determined coefficients, said search region being limited by the values of the power levels and the activation degree ratio;

determining the intermodulation distortion within a search region from one of the model relationship and the series expansion; and selecting the power levels and the activation degree ratio that linearize the modulator's transmission function to a predetermined level;

dividing a carrier wave applied to an input of the modulator between the sub-modulators according to the selected power levels;

generating modulating control signals having predetermined amplitudes and signal components of least two frequencies; and modulating the parts of the carrier wave with the modulating control signals such that the modulator's transmission function is linearized and a modulated carrier wave having a predetermined modulation depth and minimized intermodulation distortion is produced.

2. The method of claim 1, wherein the sub-modulators are mutually connected in parallel and the coefficients of the consecutive terms of the series expansion depend on the power levels and the activation degree ratio.

3. A method of reducing intermodulation distortion of an electrooptic modulator comprising first and second sub-modulators, each sub-modulator having a carrier wave input and a modulated carrier wave output and means for modulating a carrier wave in accordance with a control signal and having a respective degree of activation and a respective non-linear sub-transmission function, said electrooptic modulator further having means for selectively dividing a carrier wave between the first and second sub-modulators and means for superimposing modulated carrier waves delivered by the first and second sub-modulators, said method comprising the steps of:

dividing a carder wave between the first and second sub-modulators;

applying control signals to said modulating means of said sub-modulators, wherein the amplitudes of the control signals are proportional to a common control signal value;

modulating the carrier wave with said control signals to produce modulated sub-waves which have selected modulation depths and are delivered from the modulated carrier wave outputs of the sub-modulators to the superimposing means;

superimposing the modulated sub-waves to produce a resultant modulated wave in said superimposing means; and selecting the powers of the carrier waves delivered to the sub-modulators, a ratio between the activation degrees of the sub-modulators, and the modulation depths such that intermodulation distortion of the common control signal is less than a predetermined value.

4. The method of claim 3, wherein the selected powers, activation degree ratio, and modulation depths cause a higher-order term of a series expansion of the modulator's transmission function to counteract another higher-order term of the series expansion.

5. An electrooptic modulator having reduced intermodulation distortion comprising:

first and second sub-modulators, each sub-modulator having a carrier wave input and a modulated carrier wave output and means for modulating a carrier wave in accordance with a control signal and having a respective degree of activation and a respective non-linear sub-transmission function; said electrooptic modulator further comprising:

means for selectively dividing a carrier wave between the first and second sub-modulators;

means for superimposing modulated carrier waves delivered by the first and second sub-modulators; and means for selectively generating control signals, wherein the control signals are applied to said modulating means of said sub-modulators and the amplitudes of the control signals are proportional to a common control signal value, wherein the sub-modulators modulate their respective portions of the carrier wave in accordance with said control signals and produce modulated sub-waves which have selected modulation depths and are delivered from the modulated carrier wave outputs to the superimposing means, the superimposing means superimposes the modulated sub-waves to produce a resultant modulated wave, and the powers of the carrier waves delivered to the sub-modulators, a ratio between the activation degrees of the sub-modulators, and the modulation depths are such that intermodulation distortion of the common control signal is less than a predetermined value.

6. The modulator of claim 5, wherein the selected powers, activation degree ratio, and modulation depths cause a higher-order term of a series expansion of a transmission function of the modulator to counteract another higher-order term of the series expansion.

* * * * *